No. 831,508. PATENTED SEPT. 18, 1906.
Z. T. GRAGG.
WEIGHING SCALE.
APPLICATION FILED JUNE 13, 1905.

Witnesses
S. C. Taylor
Mary F. Linberry

Inventor
Zachry T Gragg
By A. C. Marble
Attorney

No. 831,508. PATENTED SEPT. 18, 1906.
Z. T. GRAGG.
WEIGHING SCALE.
APPLICATION FILED JUNE 13, 1905.
3 SHEETS—SHEET 2.
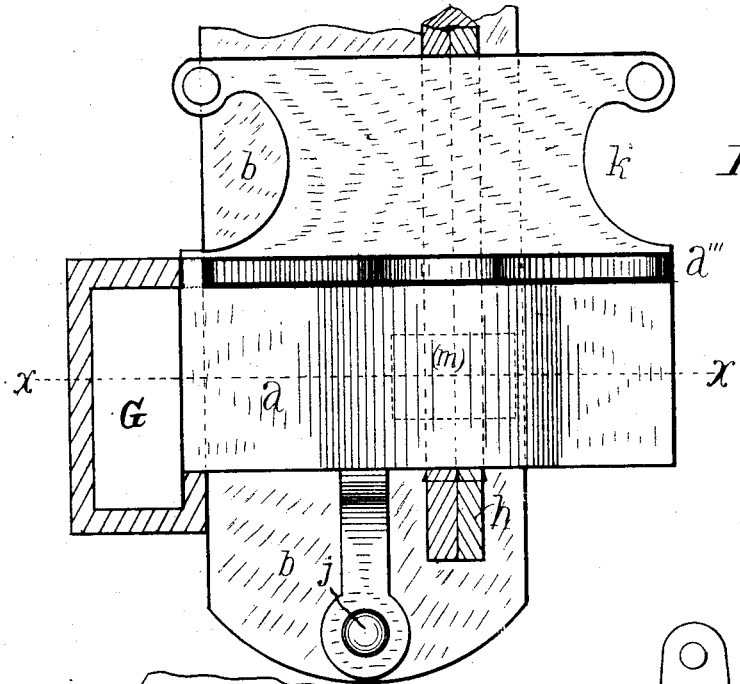
Fig. 3.
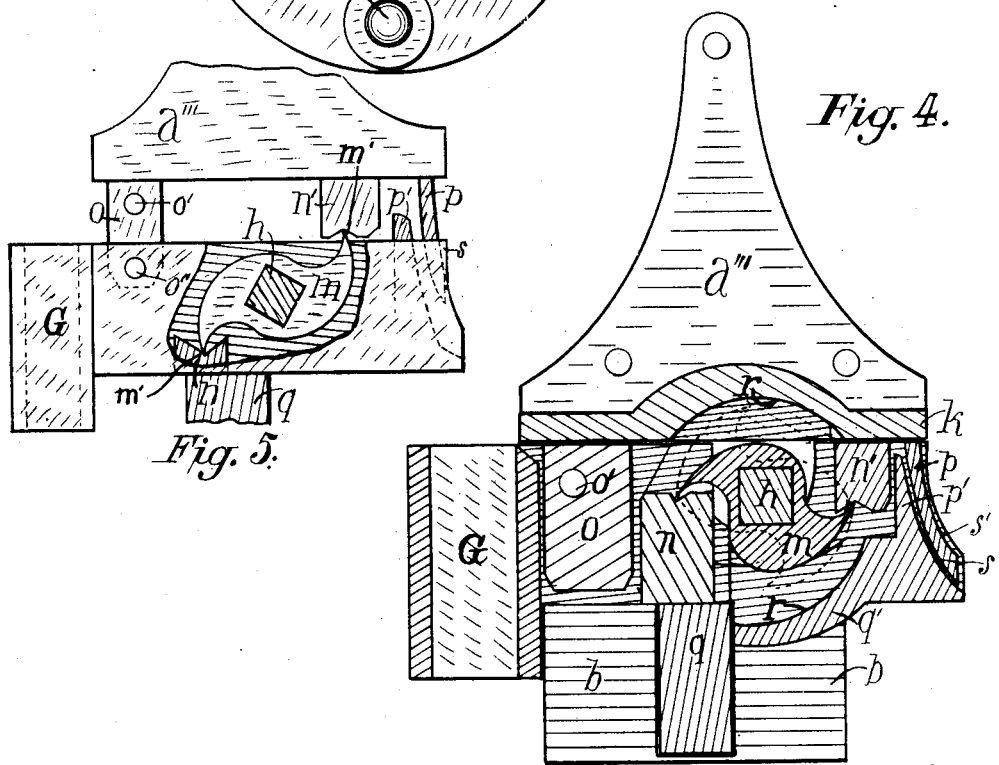
Fig. 4.
Fig. 5.
Witnesses
S. C. Taylor
Mary F. Lineberry
Inventor
Zachry T Gragg
By A. D. Marble
Attorney
THE NORRIS PETERS CO., WASHINGTON, D. C.

No. 831,508.  
PATENTED SEPT. 18, 1906.
Z. T. GRAGG.  
WEIGHING SCALE.  
APPLICATION FILED JUNE 13, 1905.
3 SHEETS—SHEET 3.
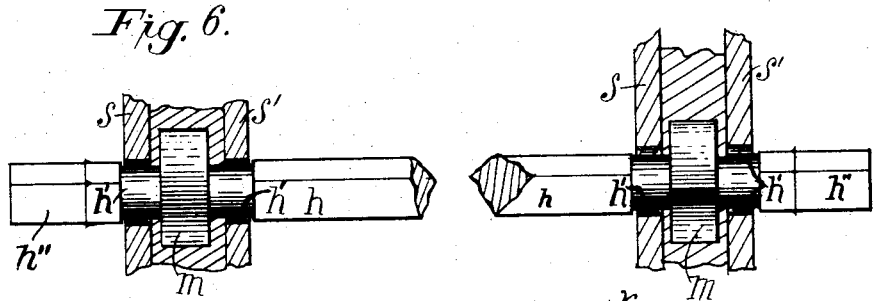
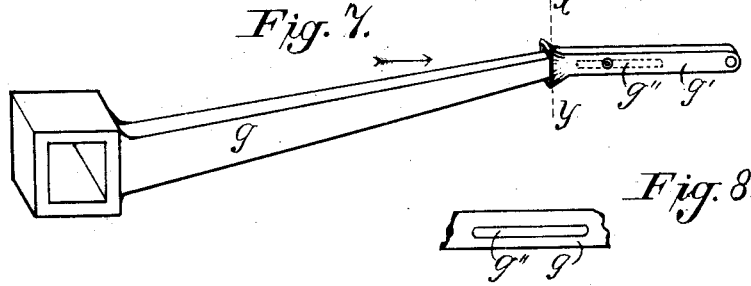
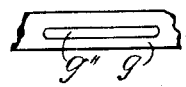
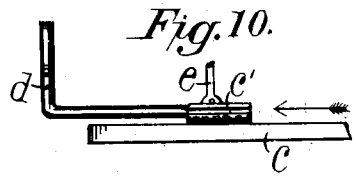
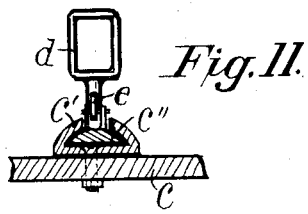
Witnesses  
S. C. Taylor  
Mary F. Lineberry
Inventor  
Zachry T. Gragg  
By A. L. Marble  
Attorney
THE NORRIS PETERS CO., WASHINGTON, D. C.

UNITED STATES PATENT OFFICE.

ZACHRY T. GRAGG, OF OKLAHOMA, OKLAHOMA TERRITORY, ASSIGNOR OF ONE-HALF TO JAMES A. TOBIN, OF OKLAHOMA, OKLAHOMA TERRITORY.

WEIGHING-SCALE.

No. 831,508.　　　　　Specification of Letters Patent.　　　　　Patented Sept. 18, 1906.

Application filed June 13, 1905. Serial No. 265,106.

*To all whom it may concern:*

Be it known that I, ZACHRY T. GRAGG, a citizen of the United States, residing at Oklahoma city, in the county of Oklahoma and Territory of Oklahoma, have invented new and useful Improvements in Weighing-Scales, of which the following is a specification.

This invention relates to weighing attachments for cars, wagons, and other vehicles, and has for its object to provide an inexpensive, durable, and efficient device of this character capable of being readily attached to the vehicle and by means of which the weight of the load or contents of the vehicle may be quickly and accurately ascertained.

A further object of the invention is to provide means for disconnecting the operative parts of the weighing mechanism when the device is not in use and means for varying the length of the scale-lever.

A still further object is to provide a plurality of sectional supporting-boxes mounted on opposite ends of the vehicle-bolsters and movable vertically to elevate the wagon-box when the scale-levers are operatively connected to the scale-beam.

With these and other objects in view the invention consists in the construction and novel combination and arrangements of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a side elevation, partly in perspective, of a wagon, showing my improved weighing attachment applied thereto and in position for weighing the contents or load of the wagon-box. Fig. 2 is an end elevation, partly in section, of one of the supporting-boxes, showing the manner of attaching the same to the bolster and wagon-body. Fig. 3 is a plan view of Fig. 2 with the wagon-body removed. Fig. 4 is a sectional side elevation of Fig. 3 as seen from the side of the wagon, portions being broken away to expose the interior construction of the supporting-boxes. Fig. 5 is a similar view showing one of the box-sections in elevated position. Fig. 6 is a sectional plan view of one of the lifting rods or bars. Fig. 7 is a perspective view of one of the scale-levers detached. Fig. 8 is a sectional elevation of the slotted end of the scale-levers. Fig. 9 is a transverse sectional view taken on the line $x\ y$ of Fig. 7. Fig. 10 is a view in elevation of a portion of the footboard of the wagon-box with the guide-loop in position thereon. Fig. 11 is an end view of Fig. 10 looking in the direction of the arrow.

Similar letters refer to similar parts in all the figures of the drawings.

The improved weighing device, which may be used in connection with wagons, cars, platforms, and the like is shown, by way of illustration, attached to an ordinary farm-wagon, in which A indicates the wagon-box, and B the running-gear.

Secured to the opposite ends of the front and rear wagon-bolsters $b$ are fulcrum-boxes, preferably formed in two sections $a$ and $a'$, the lower section $a'$ of each box being rigidly secured to the adjacent bolster, as by bolt $j$, while the section $a$ is mounted for vertical movement between a pair of spaced flanges S and S' on the stationary section and provided with a vertical extension $a''$ and a lateral projection or wing K for attachment, respectively, to the side and bottom of the wagon-body, as shown.

The lower sections $a'$ of the boxes are further retained in position by means of depending lugs $q$, which engage correspondingly-shaped recesses in the bolsters $b$, there being an inclined guide-lug $p'$, disposed between the flanges S and S' at one end of each stationary section and a socket G at the opposite end thereof adapted to receive a stake when needed.

Extending transversely of the wagon-body through auxiliary bolsters $b''$ and journaled in bearings $h'$ in the spaced flanges S and S' are rocking or lifting bars $h$ the opposite ends of which extend beyond the flanges S and are provided with squared terminals $h''$, for the purpose hereinafter referred to.

Rigidly secured to the rocking or lifting bars L and mounted to turn with the latter between the vertical flanges S and S' are double eccentric levers $m$, provided with knife-edges $m'$, adapted to engage the bearing-faces of suitable studs $n$ and $n'$, preferably formed integral with the upper and lower sections, respectively, of the fulcrum-boxes. The movable box-section $a$ is provided with a depending guiding-spur $p$, which bears against the lug $p'$ and serves to guide said box-section when moved to operative and inoperative positions by the movement of the eccentric levers $m$, attention being called to the fact that the lug $p'$ also bears against the stud $n'$, thereby preventing lateral movement of said section. Secured to or formed integral with the movable section of each box is a depending lug $o$, which enters the recess formed between the flanges S and S' and serves as an additional means for guiding said movable section, there being an opening $o'$ formed in the lug $o$, adapted to register with corresponding openings $o''$ in the flanges S and S' when the movable section is lowered to permit the insertion of a bolt or pin for locking the two sections together when the weighing attachment is not in use. The base of the stationary section and the top of the movable section are also curved or hollowed, as indicated at $r$ in Fig. 4 of the drawings, to permit the free turning movement of the eccentric levers.

Secured to the footboard C of the wagon is a bracket provided with inwardly-extending guide-flanges $c'$, between which is slidably mounted the enlarged head $c''$ of the scale-beam guide $d$, the latter having one end thereof bent upwardly and terminating in a guide-loop adapted to receive the scale-beam $e'$, as shown. Pivoted to the head $c''$ is a pull-rod $e$, having its upper end bifurcated and attached to the scale-beam $e'$, the latter being graduated in pounds and fractions thereof in the usual manner and provided with a balance-block $f'$, poise $e''$, and swinging poise-holder $u$.

Connecting the scale-beam $e'$ and the lifting rods or bars $h$ are removable levers $g$, one end of each of which is provided with a squared socket for the reception of the correspondingly-squared end of the adjacent rod $h$, while the opposite end thereof is provided with an adjustable sleeve or collar $g'$, connected, through the medium of a hook $f$, to the scale-beam, as shown. The reduced ends of the scale-levers $g$ are provided with elongated slots $g''$, adapted to receive clamping-bolts which extend through the adjustable sleeves or collars and serve to clamp the latter in adjustable position so as to maintain uniformity of length of said levers under various conditions.

When it is desired to weigh the load or contents of the wagon-body, the head of the scale-beam guide is inserted between the guide-flanges $c'$ with the upstanding loop embracing the adjacent end of the scale-beam, after which the levers $g$ are fitted over the ends of the lifting-rods $h$ and the extensions or adjustable collars connected to the hook by exerting a downward pressure on said collars. As the ends of the levers $g$ are forced downwardly into engagement with the hook $f$ the rods $h$ are partially rotated, thereby causing the knife-edges of the eccentric levers to engage the bearings in the studs $n$ and $n'$ and elevate the movable sections of the supporting-boxes, together with the wagon-box, to the position shown in Figs. 1 and 5—that is to say, in position to weigh the load. After the gross weight is thus obtained the load is removed from the wagon and the latter weighed, the weight of the wagon being deducted from the gross weight to determine the net weight of the load of grain or other material in the vehicle.

The attachment is readily disconnected by removing the scale-levers $g$, which permits the movable box-sections carrying the wagon-body to return to the position shown in Fig. 2, the guide $d$ and pull-rod $e$ being subsequently detached and, together with the scale-levers, placed within the wagon-box for further use.

While the scale attachment is particularly designed for attachment to farm-wagons, it is obvious that the same may be used with equally good results in connection with trucks, drays, cars, and a great variety of vehicles with but very slight modification and without departing from the spirit or sacrificing any of the principles.

Having thus described the invention, what is claimed is—

1. In weighing mechanism, the combination with a vehicle-body, of the running-gear, fulcrum-boxes interposed between the running-gear and body, double eccentric levers journaled in the boxes and forming fulcrums, a scale-beam, and levers connecting the fulcrum-levers and scale-beam.

2. In weighing mechanism, the combination with a vehicle-body, of the bolsters, sectional fulcrum-boxes carried by the bolsters and having a section of each box secured to the vehicle-body, means disposed within the boxes and forming fulcrums, a scale-beam, and levers forming a connection between the fulcrums and scale-beam.

3. In weighing mechanism, the combination with a vehicle-body, of the bolsters, fulcrum-boxes carried by the bolsters and provided with vertically-movable sections for attachment to the vehicle-body, means disposed within the boxes and forming fulcrums, a scale-beam, and levers forming a connection between the fulcrum and scale-beam.

4. In weighing mechanism, the combination with a vehicle-body, of the bolsters, fulcrum-boxes secured to the bolsters and provided with vertically-movable sections for attachment to the vehicle-body, levers forming fulcrums disposed within the boxes for elevating the movable sections of the latter, a scale-beam, and levers connecting the fulcrum-levers and scale-beam.

5. In weighing mechanism, the combination with a vehicle-body, of the bolsters, fulcrum-boxes secured to the bolsters at the opposite ends thereof and provided with vertically-movable sections for attachment to the vehicle-body, means carried by the stationary sections and forming fulcrums, a scale-beam, and levers forming a connection between the fulcrums and scale-beam.

6. In weighing mechanism, the combination with a vehicle-body, of the running-gear, fulcrum-boxes secured to the running-gear and provided with vertically-movable sections for attachment to the vehicle-body, lever-forming fulcrums disposed within the boxes for elevating the movable sections thereof, a scale-beam, levers connecting the fulcrum-levers and scale-beam, means for guiding the movable box-sections, and means for locking said movable sections in lowered position.

7. In weighing mechanism, the combination with a vehicle-body, of the running-gear, fulcrum-boxes secured to the running-gear and provided with vertically-movable sections for attachment to the vehicle-body, lifting-bars journaled in the stationary sections of the boxes and provided with terminal squared portions, levers secured to the shaft and forming fulcrums, a scale-beam, and levers connected to the scale-beam and provided with squared sockets adapted to receive the ends of the lifting-bars.

8. In weighing mechanism, the combination with a vehicle-body, of the running-gear, fulcrums carried by the running-gear, a scale-beam, and longitudinally-adjustable levers connecting the fulcrums and scale-beam.

9. In weighing mechanism, the combination with a vehicle-body, of the running-gear, fulcrum-boxes secured to the running-gear and provided with vertically-movable sections for attachment to the vehicle-body, levers disposed within the boxes and forming fulcrums, a scale-beam, and levers, one end of each of which is secured to the adjacent fulcrum-lever and the opposite end thereof provided with a longitudinally-adjustable sleeve for connection with the scale-beam.

10. In weighing mechanism, the combination with a vehicle-body, of the running-gear, fulcrum-boxes secured to the running-gear provided with vertically-movable sections for attachment to the vehicle-body, studs extending in opposite directions from each section of the boxes, double eccentric levers journaled within the boxes and engaging said studs, a scale-beam, and levers connecting the eccentric levers and the scale-beam.

11. In weighing mechanism, the combination with a vehicle-body, of the running-gear, fulcrum-boxes formed of a plurality of sections the lower section of each of which is secured to the running-gear and provided with a vertical guide-rib and the upper section attached to the vehicle and provided with a depending guide-lug for engagement with said rib, a lifting-bar journaled in the boxes, double eccentric levers carried by the lifting-bars for elevating the movable sections, a scale-beam, and levers connecting the lifting-bars and scale-beam.

12. In weighing mechanism, the combination with a vehicle-body, of the running-gear, levers fulcrumed in the running-gear, a scale-beam connected to the levers, a bracket secured to the vehicle-body and provided with guide-flanges, and a guide seated between the flanges and having its free end bent upwardly and terminating in a loop for limiting the movement of the scale-beam.

In testimony whereof I affix my signature in presence of two subscribing witnesses.

ZACHRY T. GRAGG.

Witnesses:
KATHERINE TOBIN,
MAYME GIBBONS.